No. 830,667. PATENTED SEPT. 11, 1906.
J. KIRKPATRICK.
CULTIVATOR.
APPLICATION FILED FEB. 5, 1906.
3 SHEETS—SHEET 1.
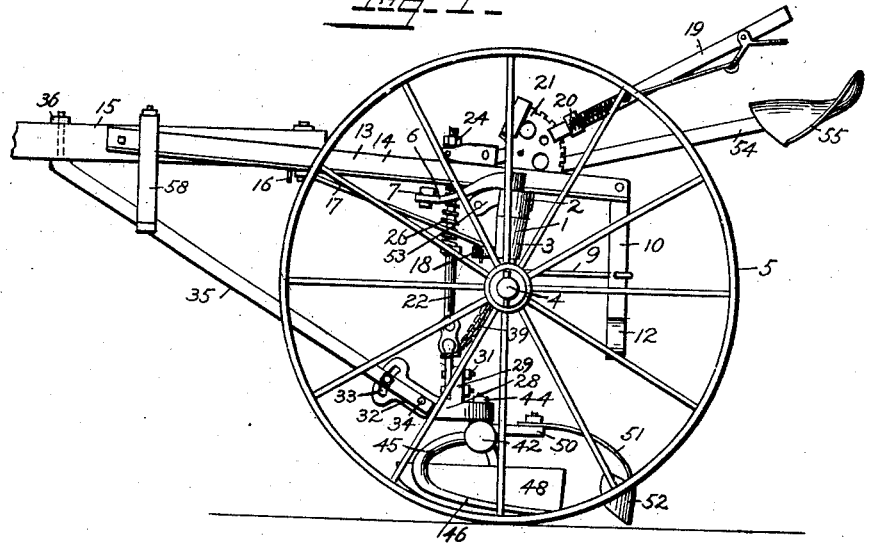
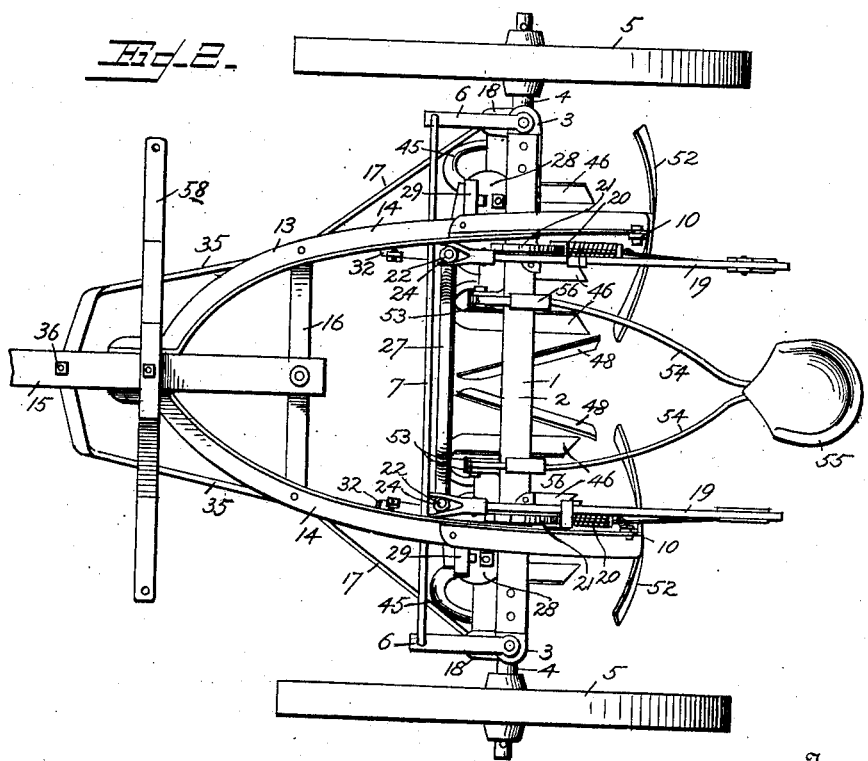
Witnesses
F. L. Ourand
P. H. Griesbauer
Inventor
James Kirkpatrick
by H. B. Willson
Attorney

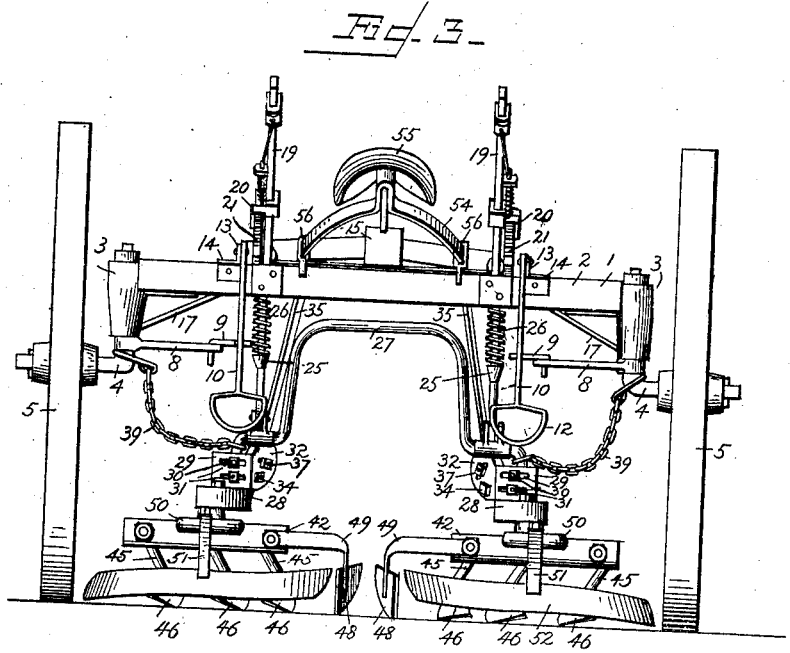

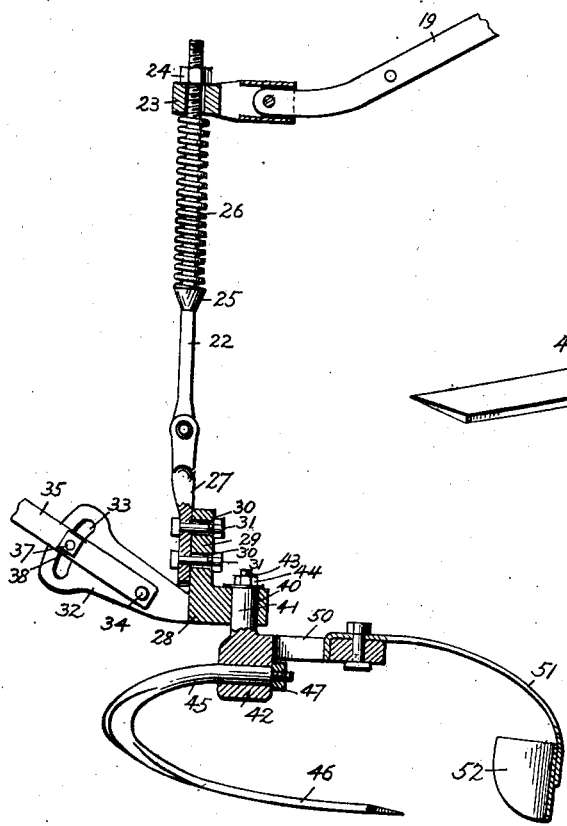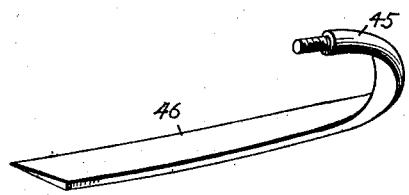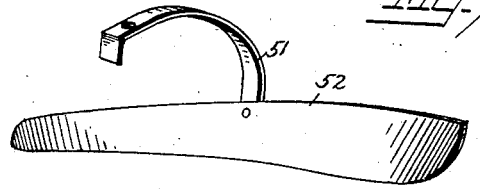

UNITED STATES PATENT OFFICE.

JAMES KIRKPATRICK, OF WHITTEMORE, IOWA.

CULTIVATOR.

No. 830,667. Specification of Letters Patent. Patented Sept. 11, 1906.

Application filed February 5, 1906. Serial No. 299,608.

*To all whom it may concern:*

Be it known that I, JAMES KIRKPATRICK, a citizen of the United States, residing at Whittemore, in the county of Kossuth and State of Iowa, have invented certain new and useful Improvements in Cultivators; and I do declare the following to be a full, clear, and exact description of the invention, such as will enable others skilled in the art to which it appertains to make and use the same.

This invention relates to improvements in cultivators.

The object of the invention is to provide a cultivator which will thoroughly loosen up and work the surface of the ground and mulch the soil against the plants being cultivated.

Another object is to provide an improved steering mechanism for guiding the movement of the machine, means being also provided for regulating the space between the cultivating-blades and the angle at which it is desired the same shall work.

A further object is to provide means for yieldingly supporting the cultivator-frames and means for raising or lowering and holding the same to cause the blades to cultivate deep or shallow and to raise the same entirely above the ground, means being also provided to regulate the level of the driver's seat.

With these and other objects in view the invention consists of certain novel features of construction, combination, and arrangement of parts, as will be hereinafter described and claimed.

In the accompanying drawings, Figure 1 is a side view of the cultivator. Fig. 2 is a top plan view. Fig. 3 is a rear elevation. Fig. 4 is a central vertical longitudinal sectional view of the same. Fig. 5 is a detail vertical sectional view through one of the cultivator-beams and the supporting mechanism therefor. Fig. 6 is a detail perspective view of one of the cultivator-blades, and Fig. 7 is a similar view of one of the mulching-blades.

Referring more particularly to the drawings, 1 denotes the frame of the machine, said frame consisting of a horizontally-disposed cross-bar 2, to the outer ends of which are secured vertically-disposed bearing-brackets 3. In the brackets 3 are journaled the vertically-disposed portion of right-angularly formed axles 4, on the horizontal portions of which are journaled supporting-wheels 5. To the upper projecting ends of the vertical portions of the axles 4 are secured forwardly and downwardly projecting arms 6, connected together by means of a cross-bar 7.

To the vertical portions of the axles immediately below the bearing-brackets 3 are secured inwardly-projecting arms 8, in the inner ends of which are formed a series of vertically-disposed apertures, with one of which are connected the downwardly-bent forward ends of guide rods or bars 9, the opposite or rear ends of which are pivotally connected to depending foot-rest bars 10, on the lower ends of which are formed foot-rests 12. The upper ends of the foot-rest bars 10 are pivotally connected to the rearwardly-projecting ends of a draft-frame 13, which consists of angle-iron bars 14, bolted or otherwise secured to the cross-bar 1 and extending forwardly and curving inwardly, as shown. The forward inwardly-curved ends of the bars 14 are rigidly connected to the rear end of a draft-tongue 15. Said bars 14 are connected by a cross-bar 16, to which the rear end of the tongue is also connected. The angle-bars 14 are further supported by means of brace-bars 17, which are connected to the bars 14 at the end of the cross-bar 16 and are connected at their opposite ends to apertured lugs 18, formed on the bearing-brackets 3 of the axle.

Pivotally mounted on the cross-bar 2 inside the ends of the draft-frame bars 14 are regulating-levers 19, said levers being provided with spring-projected pawls 20, which are adapted to engage the teeth of segmental racks 21, fixed upon the cross-bar 2, as shown. To the bifurcated forward ends of the levers 19 are pivotally connected the upper ends of supporting-rods 22. Said rods are adapted to pass through guide-blocks 23, pivotally connected to the ends of the regulating-levers, the upper end of the rods 22 being threaded to receive adjusting-nuts 24, which are adapted to rest upon the block 23, thereby loosely supporting said rods and permitting the same to be vertically adjusted. On the rods 22 are formed shoulders 25, and on said rods between the shoulders 25 and the guide-blocks 23 are disposed coiled springs 26, by means of which the rods 22 are yieldingly supported by the regulating-levers 19.

Pivotally connected to the lower ends of the rods 22 is a yoke-shaped cultivator-frame 27, to the lower ends of which are adjustably connected supporting-blocks 28, to which the cultivator-beams are adjustably connected. The blocks 28 are provided with upwardly-projecting lugs 29, in which are formed parallel horizontally-disposed slots 30. Through the lower ends of the cultivator-frame 27 and the slots 30 are adapted to be passed connecting-bolts 31, by which the blocks 28 are adjustably connected to the lower end of said cultivator-frame to permit said blocks to be moved laterally on the lower ends of the frame. On the inner side of each of the blocks 28 are formed forwardly-projecting arms 32, in the outer ends of which are formed segmental slots 33. Pivotally connected to the arms 32, by means of pivot-bolts 34, are the inner ends of a yoke-shaped connecting-frame 35, the outer end of which is pivotally connected to the under side of the tongue 15, as shown at 36. The side bars of the frame 35, near the rear pivoted ends of the same, are provided with bolts 37, which are adapted to pass through segmental slots 33 in the ends of the arms 32. On said bolts are adapted to be screwed clamping-nuts 38. By means of the slots 33 the blocks 28 may be adjusted to different angles on the ends of the frame 35, and by means of the bolt 37 and nuts 38 said blocks may be secured at the angle to which the same may be adjusted. In order to limit the lateral movement or swinging of the cultivator-frame, the lower ends of the same, immediately above the blocks 28, are connected to the ends of chains 39, the opposite ends of which are connected to the axles 4, as shown.

In the rear ends of the blocks 28 are formed vertically-disposed slots 40, in which are inserted cylindrical lugs 41, formed on the upper side of cultivator-beams 42. Said lugs are preferably arranged midway between the ends of the beams 42, and on the upper end of the same are formed upwardly-projecting threaded extensions 43, which are passed upwardly through apertures in the upper wall of the sockets 40 and have screwed thereon retaining-nuts 44, by which the beams are adjustably connected with the supporting-blocks 28. By loosening the nuts 44 the cultivator-beams may be turned at various angles with respect to the blocks 28 and may be held at such angles by again tightening the nuts 44.

The cultivator-beams 42 are provided with a series of longitudinally-disposed apertures, through which are inserted the upwardly and rearwardly turned ends or shanks 45 of cultivator-blades 46. There may be any number of cultivator-blades 46, two of the same being shown in the present instance, and each of said blades consists of the upwardly and rearwardly turned shanks 45 and an elongated cultivator-blade portion which is disposed at a slight angle to the surface of the ground, said blades being formed with inwardly-projecting cutting edges, as shown. The shanks 45 of the cultivator-blades are provided with reduced threaded ends which project through the cultivator-beams and are adapted to have screwed thereon retaining-nuts 47, by which the cultivator-blades are securely held in place on the beams. Adjustably connected to the inner end of each of the beams 42 is a fender plate or board 48, said boards or blades being provided with right-angular upwardly-projecting arms or bars 49, in the upper ends of which are formed apertures by which said arms are engaged with the threaded end of the inner cultivator-blade, thereby adjustably securing the fender plates or boards to the cultivator-beams.

On the rear side of the cultivator-beams 42, midway between the ends of the same, are formed rearwardly-projecting arms or brackets 50, to which are pivotally and adjustably connected the forwardly-projecting standards or supporting-arms 51 of transversely-disposed mulching-blades 52. These blades 52 are curved forwardly, as shown in Fig. 2, and their lower edges are inclined from their inner ends downwardly toward their outer ends, as shown in Fig. 3. Said blades are located in rear of the cultivator-blades and serve to push the pulverized earth up to the plants. The blades are relatively long and narrow and at their inner ends are inclined from their lower edges upwardly and rearwardly and at their outer ends upwardly and forwardly, as shown by plan view, Fig. 2.

On the forward side of the cross-bar 2, between the bars of the draft-frame, are formed pairs of apertured bearing-lugs 53, between which are pivotally connected the downwardly-bent forward ends of a V-shaped seat-supporting frame 54. On the rear end of the frame 54 is secured a driver's seat 55. The downwardly-projecting ends of the seat-frame are provided with a series of apertures whereby the same may be adjustably connected to the lugs 53. The bars of the seat-frame are further provided with sliding sleeves 56, which frictionally engage the side bars of the seat-frame and are provided on their lower sides with downwardly-projecting plates 57. In these plates 57 are formed a series of notches or offsets which are arranged at different levels, so that by shifting the sleeves 56 along the side bars of the seat-frame the different notches or offsets may be brought into position to rest upon the top of the cross-bar, thereby supporting the seat-frame at different levels, thus providing a simple and efficient means for raising or lowering the seat. Pivotally connected to the inner end of the tongue adjacent to the end of the draft-frame is a transversely-disposed draft-bar 58, to the ends of which are connected the usual swingletrees or other draft devices.

By connecting the pivoted axles of the supporting-wheels to the rest-bars, as hereinbefore described, the machine may be easily and efficiently steered or guided along the rows of plants being cultivated, while the peculiar construction and arrangement of the cultivator and mulching blades will thoroughly and efficiently cultivate and mulch the soil against said plants.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In a surface-cultivator, the combination with a wheeled supporting-frame, of a cultivator-frame, means whereby said cultivator-frame is yieldably and adjustably supported upon said supporting-frame, pivoted foot-rest bars for guiding the cultivator, cultivator-beams carried by said cultivator-frame, means whereby said beams are adjusted laterally and angularly upon said frame, surface-cultivator blades, curved surface-blades, and fender-boards carried by said beams, substantially as described.

2. A cultivator of the character described, comprising a supporting-frame consisting of a horizontally-disposed bar, vertically-disposed bearing-brackets arranged on the ends of said bar, right-angularly-formed axles journaled in said brackets, supporting-wheels journaled on said axles, cultivator-frames carried by said bar, adjusting-levers pivotally mounted on said bar, apertured guide-blocks pivotally mounted in the ends of said levers, supporting-rods connected at their lower ends to said cultivator-frames, said rods being threaded at their upper ends and adapted to pass through said apertured guide-blocks, adjusting-nuts adapted to be screwed onto the upper threaded ends of said supporting-rods, coiled springs arranged on said rods between said guide-blocks and a shoulder formed on the rods, and cultivator-blades carried by said frame, substantially as described.

In testimony whereof I have hereunto set my hand in presence of two subscribing witnesses.

JAMES KIRKPATRICK.

Witnesses:
CHAS. T. COTANT,
THOS. CARMODY.